(12) United States Patent
Jacobs et al.

(10) Patent No.: US 7,978,242 B2
(45) Date of Patent: Jul. 12, 2011

(54) CONFIGURABLE TIMING GENERATOR

(75) Inventors: Christopher Jacobs, Bedford, NH (US);
Jianrong Chen, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 374 days.

(21) Appl. No.: 12/217,946

(22) Filed: Jul. 10, 2008

(65) Prior Publication Data
US 2009/0009646 A1 Jan. 8, 2009

Related U.S. Application Data

(62) Division of application No. 11/114,992, filed on Apr. 26, 2005, now Pat. No. 7,612,820.

(51) Int. Cl.
*H04N 3/14* (2006.01)
*H04N 5/335* (2011.01)

(52) U.S. Cl. ........................................ 348/296; 348/312

(58) Field of Classification Search .................. 348/296, 348/305, 312, 320, 322
See application file for complete search history.

(56) References Cited

U.S. PATENT DOCUMENTS

| | | |
|---|---|---|
| 6,285,399 B1 | 9/2001 | Tao |
| 6,580,456 B1 | 6/2003 | Jacobs |
| 6,784,929 B1 | 8/2004 | Chen |
| 7,304,676 B2 | 12/2007 | Compton et al. |
| 7,365,785 B2 | 4/2008 | Hashimoto et al. |
| 7,612,820 B2 | 11/2009 | Jacobs et al. |
| 2001/0017659 A1 | 8/2001 | Suzuki |
| 2001/0050713 A1 | 12/2001 | Kubo et al. |
| 2006/0250510 A1 | 11/2006 | Jacobs et al. |

OTHER PUBLICATIONS

Office Action dated Aug. 6, 2008 from U.S. Appl. No. 11/114,992.
Final Office Action dated Oct. 29, 2010 received in U.S. Appl. No. 12/217,947.

*Primary Examiner* — Timothy J Henn
(74) *Attorney, Agent, or Firm* — Knobbe Martens Olson & Bear LLP

(57) ABSTRACT

In one embodiment, a configurable timing generator outputs at least one timing signal. The configurable timing generator comprises a first timing generator configurable to output the at least one timing signal so that the at least one timing signal is adaptable to a plurality of applications. In one embodiment, a configurable parameter storage unit comprising a parameter storage area configurable so as to store a plurality of parameters at least partially defining a desired plurality of waveform hierarchy elements, where the desired plurality of waveform hierarchy elements enable the definition of a waveform. In one embodiment, a method of constructing a waveform for a configurable timing generator, the method comprising acts of constructing a first pattern waveform, where the first pattern waveform comprises a first basic pulse, and constructing a first sequence waveform, where the first sequence waveform comprises a plurality of repetitions of the first pattern waveform.

7 Claims, 16 Drawing Sheets

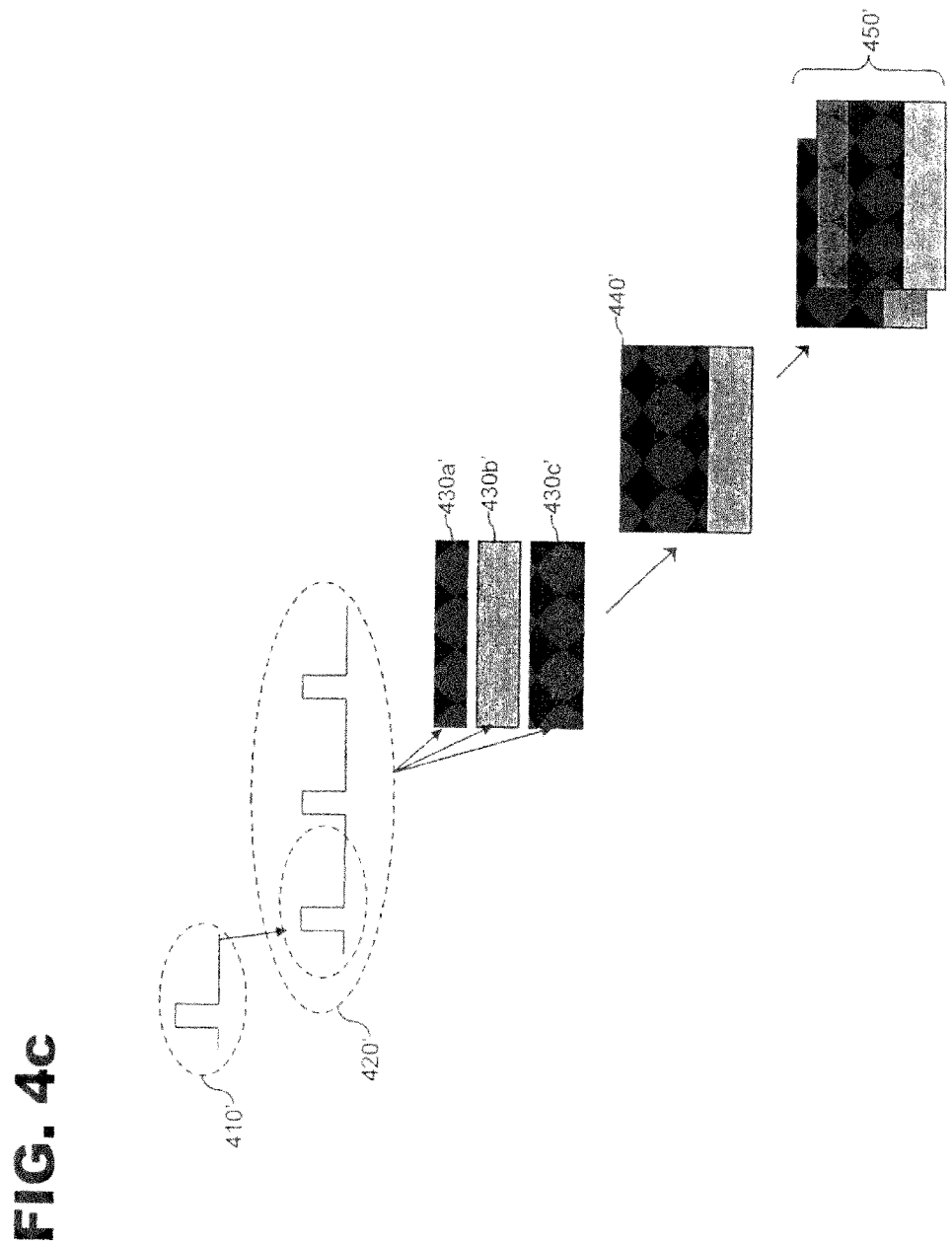

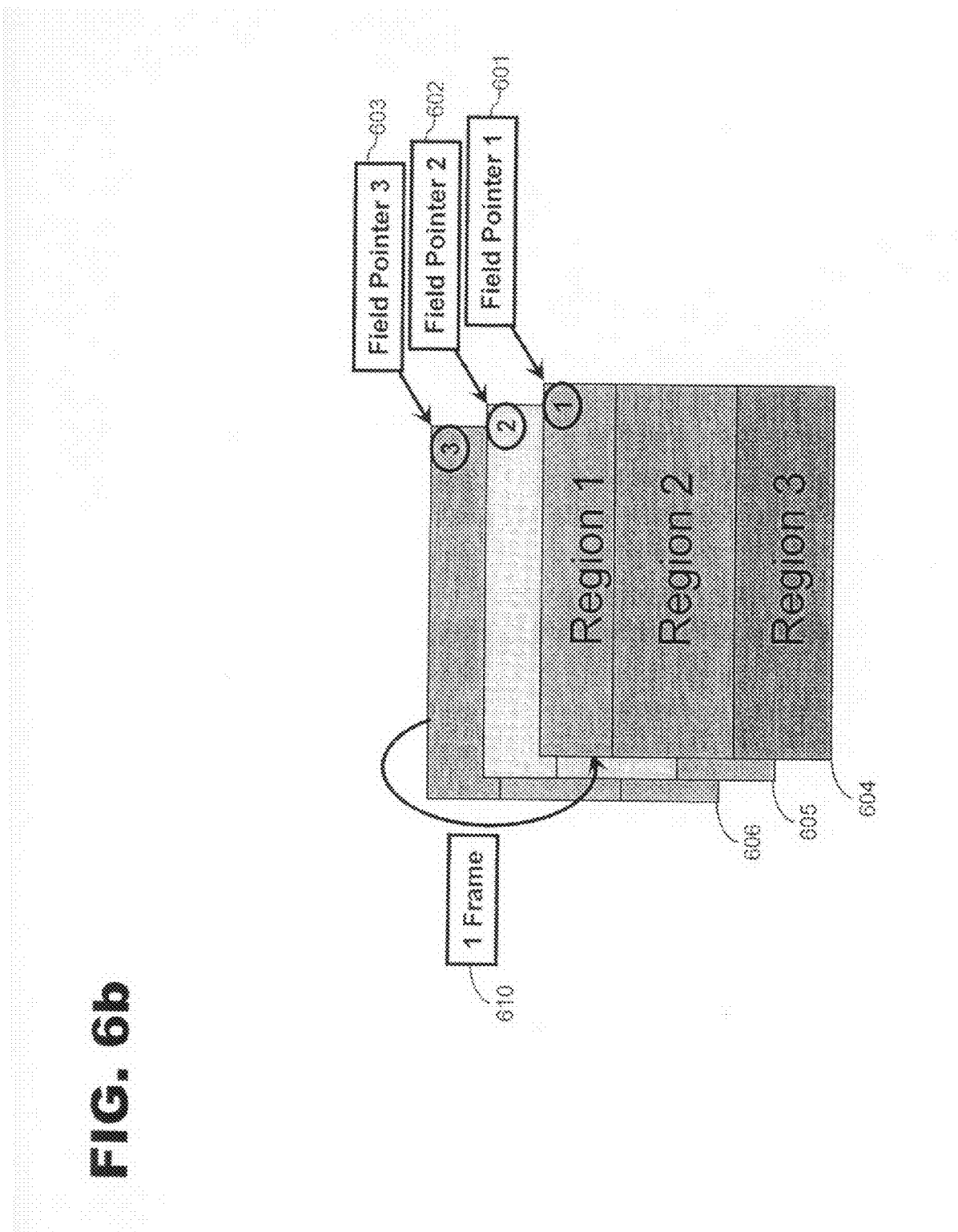

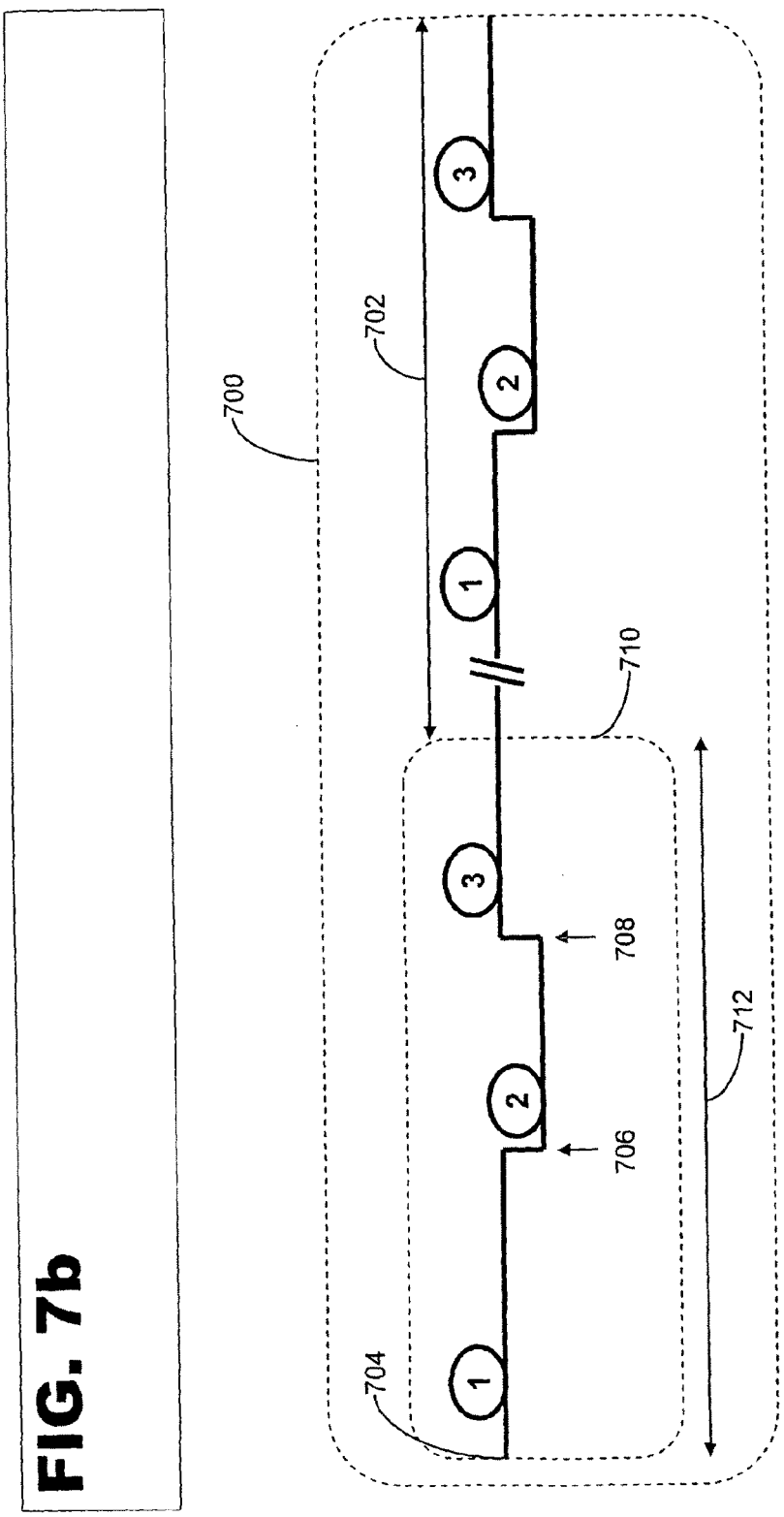

CONFIGURABLE TIMING GENERATOR

RELATED APPLICATIONS

This application is a Divisional of U.S. application Ser. No. 11/114,992, filed on Apr. 26, 2005, the subject matter of which is being incorporated herein by reference.

FIELD OF INVENTION

The invention relates to timing generators and more specifically to configurable timing generators.

BACKGROUND

Image sensors (e.g., CCD sensors, CMOS sensors) are used in numerous imaging applications to convert photons into electrons, thus enabling the use of electronics for image processing. FIG. 1 shows system building blocks for a prior art image signal processing channel 100. A timing generator 110 receives a reference clock signal and creates timing signals that are sent to the blocks in the image signal processing channel 100. An image sensor 120 (e.g., CCD, CMOS sensor) receives timing signals (e.g., H1, H2, . . . , Hx, and V1, V2, . . . , Vy) from the timing generator (TG) 110, and provides an output signal to a correlated double sampler circuit (CDS) 130. The CDS 130 receives high speed timing signals (SHP and SHD) sent by the timing generator 110 and extracts image content from the output signal of the image sensor 120, removes unwanted correlated noise, and provides an output signal to a programmable gain amplifier (PGA) 140. The PGA 140 receives a high speed timing signal (CLKPGA) from the timing generator 110, and amplifies the output signal of the CDS 130, thus providing an output signal to an analog-to-digital converter (ADC) 150. The ADC 150 receives a high speed timing signal (CLKADC) from the timing generator 110, and converts the analog output signal of the PGA 140 to a digital signal sent to a digital signal processor (DSP) 160. The DSP 160 receives a high speed timing signal (CLKDSP) from the timing generator 110, and processes the digital signal, thereby generating a digital output signal.

SUMMARY OF INVENTION

In one embodiment, a configurable timing generator outputs at least one timing signal. The configurable timing generator comprises a first timing generator configurable to output the at least one timing signal so that the at least one timing signal is adaptable to a plurality of applications.

In one embodiment, a configurable parameter storage unit comprising a parameter storage area configurable so as to store a plurality of parameters at least partially defining a desired plurality of waveform hierarchy elements, where the desired plurality of waveform hierarchy elements enable the definition of a waveform.

In one embodiment, a method of constructing a waveform for a configurable timing generator, the method comprising acts of constructing a first pattern waveform, where the first pattern waveform comprises a first basic pulse, and constructing a first sequence waveform, where the first sequence waveform comprises a plurality of repetitions of the first pattern waveform.

BRIEF DESCRIPTION OF DRAWINGS

In the drawings, each identical or nearly identical component that is illustrated in various figures is represented by a like numeral. For purposes of clarity, not every component may be labeled in every drawing. In the drawings:

FIG. 4c is an illustration of waveforms generated using the waveform construction method of FIG. 4b, in accordance with one embodiment of the invention;

FIG. 6b is an illustration of fields generated by the mode state machine of FIG. 6a, in accordance with one embodiment of the invention;

FIG. 7b is a timing diagram of a sequence waveform generated by the pixel state machine of FIG. 7a, in accordance with one embodiment of the invention;

DETAILED DESCRIPTION

Figure 1:
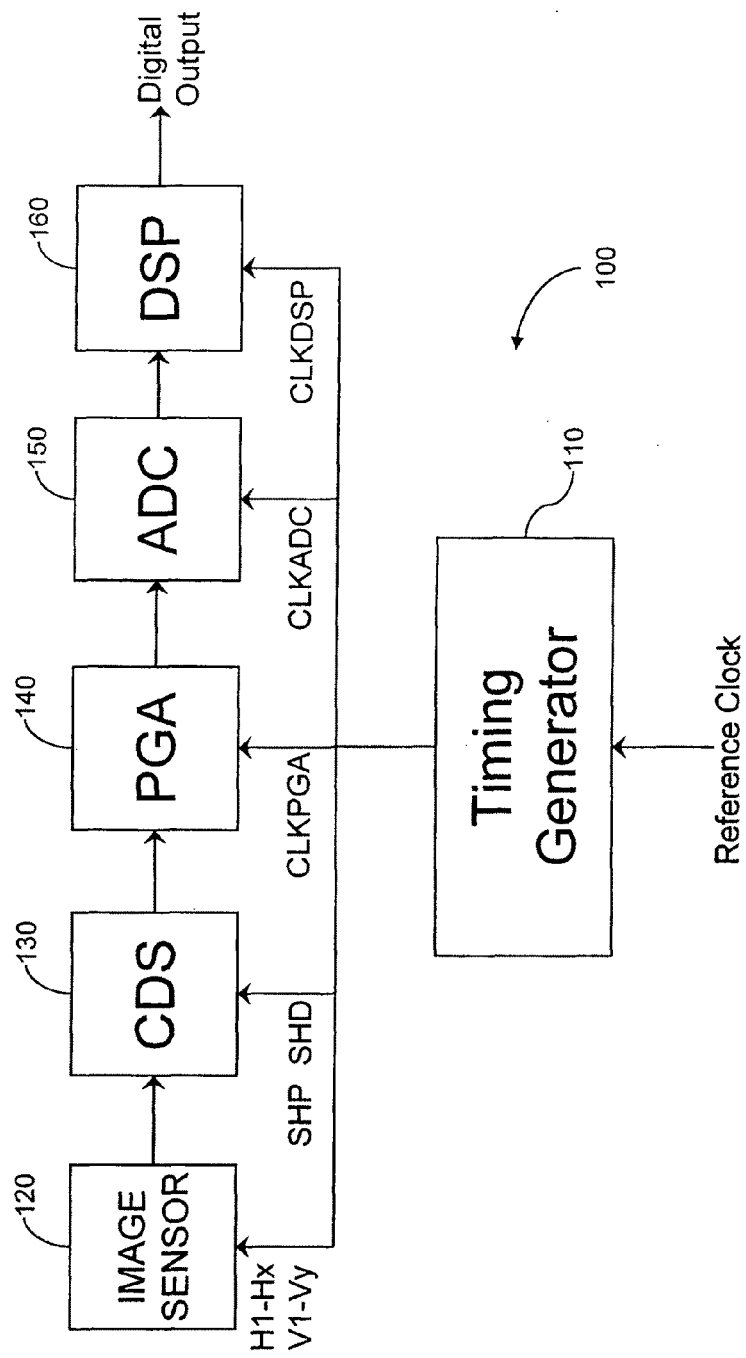
FIG. 1 is a block diagram of a prior art image signal processing channel.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

A TG of an image signal processing chain plays a role in controlling the operation of the pixel read-out from an image sensor (e.g., CCD), and hence influences the performance and stability of the signal gain. Different image sensors may be designed for different timing pulses. For example, as the complexity of timing structures increases with the number of image sensor pixels, different timing pulses may be utilized.

Figure 2:
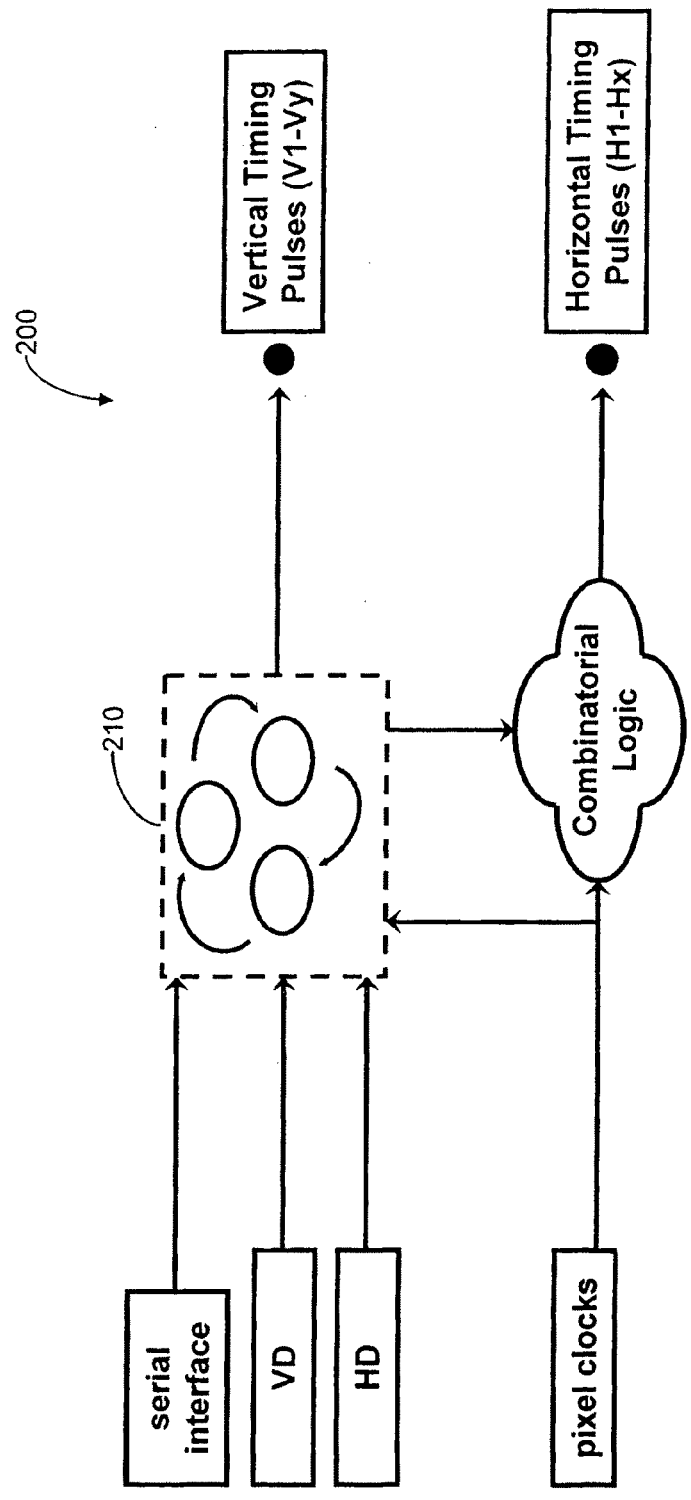
FIG. 2 is a block diagram of a prior art fixed-function timing generator.

FIG. 2 is block diagram of a prior art fixed-function timing generator 200 based on fixed-function state machines 210. Using such an architecture, only a limited number of vertical and horizontal timings can be supported, and therefore, only a small number of different image sensors can be coupled to a given fixed-function TG. Also, parameter storage on the fixed-function TG is limited since the architecture is not configurable.

Applicants have appreciated that this limitation causes the user of a fixed-function TG to use a different TG for different applications (e.g., different image sensors), therefore contributing to system complexity. Applicants have appreciated that a configurable TG circumvents some limitations of a fixed-function TG.

In accordance with some embodiments of the invention, a configurable TG generates at least one timing signal. In a further embodiment, a configurable TG generates at least one timing signal for use with an image sensor.

In accordance with other embodiments, a configurable TG that can be configured to generate at least one timing signal to operate an image sensor with any number of pixels and/or architecture (e.g., progressive and multi-field scan, interline and frame transfer, even frame-interline).

In accordance with further embodiments, a configurable TG employing a configurable storage technique that may enable efficient use of parameter storage.

Figure 3:
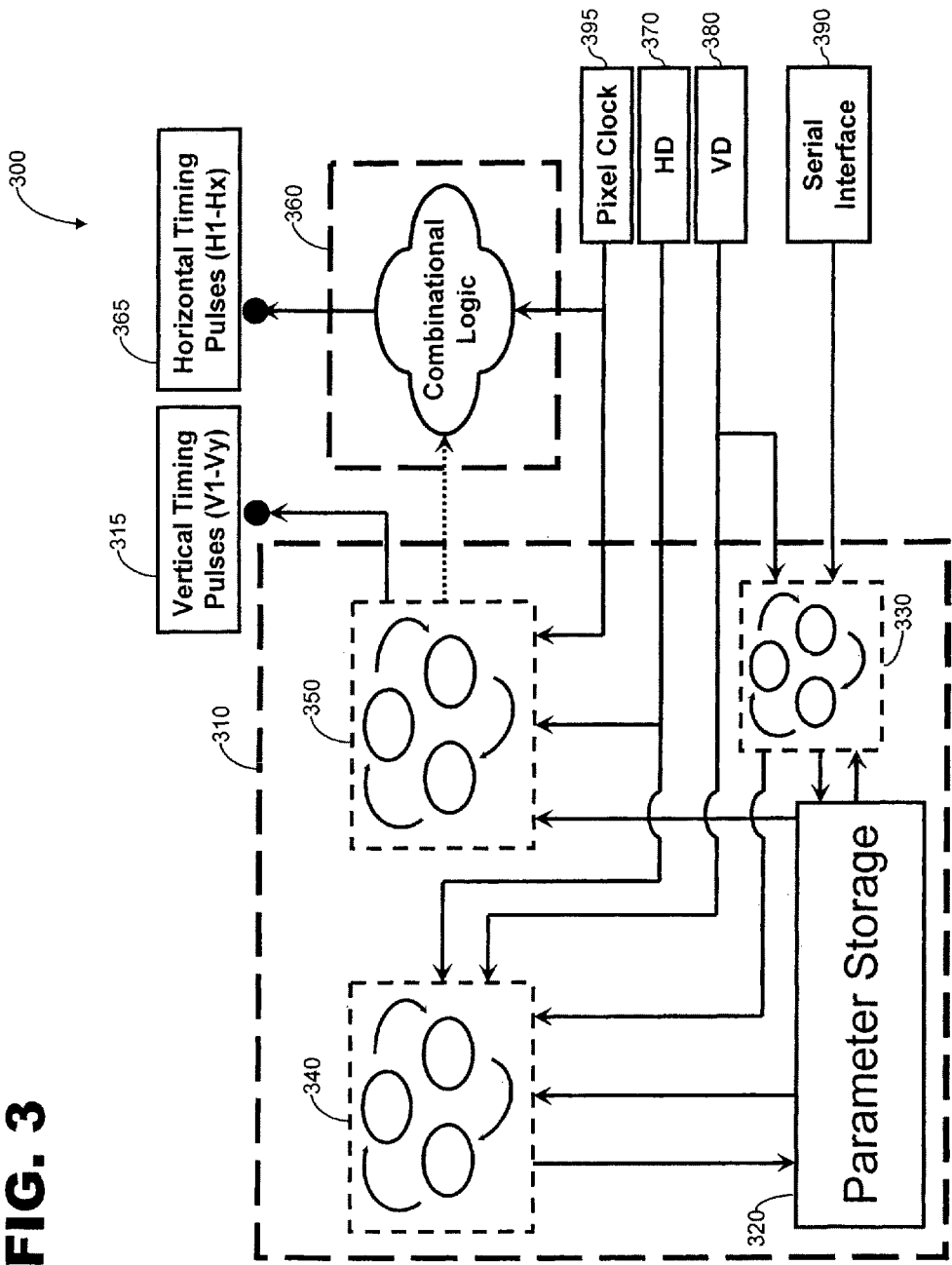
FIG. 3 is a block diagram of a configurable timing generator, in accordance with one embodiment of the invention.

FIG. 3 illustrates a block diagram for a configurable TG 300 comprising several state machines and a configurable parameter storage unit 320. These circuit blocks can interact with each other to provide more flexibility in generating timing pulses than a fixed-function TG. The configurable TG 300 comprises a vertical timing generator 310, and an horizontal timing generator 360.

The vertical timing generator 310 comprises the configurable parameter storage unit 320, a mode state machine 330, a line state machine 340, and one or more pixel state machines 350.

The mode state machine 330 can operate at the highest level of abstraction, and may control the operational mode of the configurable TG 300. The mode state machine 330 can interface with the configurable parameter storage unit 320, and the configurable parameter storage unit 320 may configure the line state machine 340 and pixel state machines 350. The vertical timing generator 310 may output one or more vertical timing pulses 315 (e.g., V1, V2, . . . , Vy) that can control the vertical readout of an image sensor.

The pixel state machines 350 in the vertical timing generator 310 may also drive the horizontal timing generator 360. The horizontal timing generator 360 can generate one or more horizontal timing pulses 365 (e.g., H1, H2, . . . , Hx), that can control the horizontal readout of an image sensor array.

The configurable TG 300 may comprise inputs for an horizontal synchronization pulse (HD) 370, a vertical synchronization pulse (VD) 380, a serial interface 390, and one or more pixel clocks 395, but these signals may be provided in other ways (e.g., internally and/or externally to the configurable TG 300), as the invention is not limited in this respect. For example, the HD 370 and VD 380 signals can be generated in the configurable TG 300 using counters. The serial interface 390 can be any type of control interface to the configurable TG 300. The pixel clocks 395 control the rate of transfer of pixel content in the image sensor to the signal processing channel.

Applicants have appreciated that timing pulses can be complex and may differ depending on the mode of operation of an image sensor. Waveform hierarchy can address this complexity by enabling a programmable algorithm to construct waveforms.

In accordance with one embodiment, a waveform hierarchy is described. The waveform hierarchy can be used in timing pulse construction and storage methods, which may be implemented as algorithms in a configurable TG.

Figure 4A:
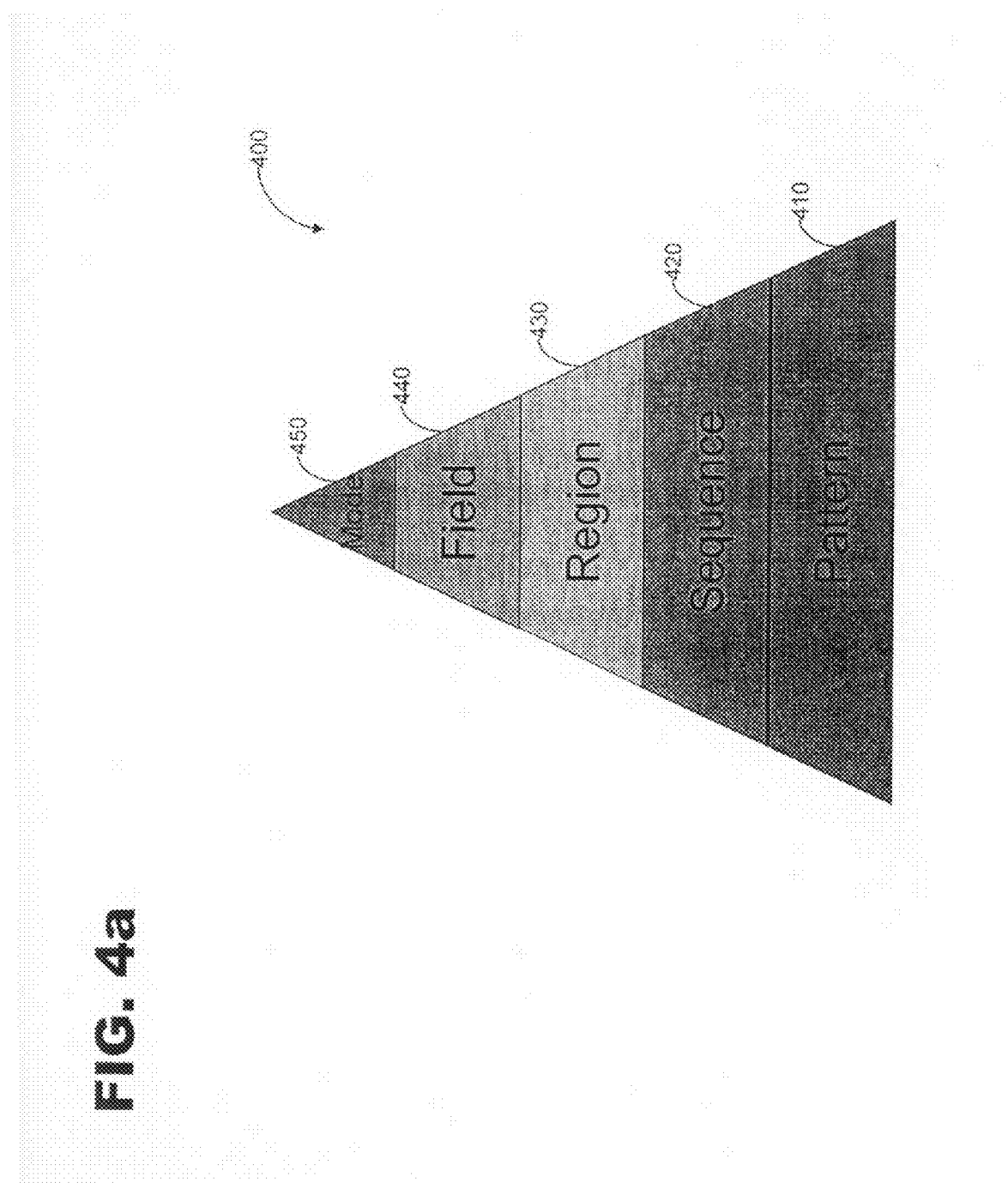
FIG. 4a is diagram of a waveform hierarchy, in accordance with one embodiment of the invention.
Figure 4B:
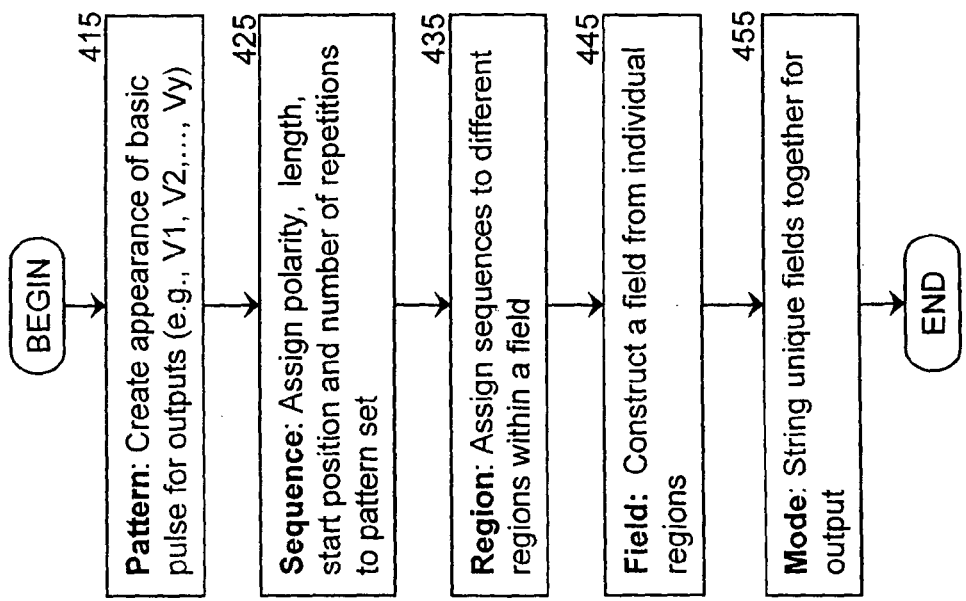
FIG. 4b is flow chart showing a waveform construction method based on the waveform hierarchy shown in FIG. 4a, in accordance with one embodiment of the invention.

FIG. 4a shows a waveform hierarchy 400 for a timing pulse, and FIG. 4c illustrates waveforms associated with a waveform construction method shown in FIG. 4b. FIG. 4a illustrates the waveform hierarchy 400 using a pyramidal diagram where a given level incorporates waveform hierarchy elements specified in the previous level. In the embodiment illustrated in FIG. 4a, the waveform hierarchy elements comprise patterns, sequences, fields, regions, and modes, but any other waveform hierarchy elements may be used, as the invention is not limited in this respect.

At a first level 410, a pattern may be specified, where the pattern comprises a basic pulse (e.g., a single pulse or set of pulses). In the context of vertical timing outputs for an image sensor, a pattern may be referred to as a V pattern.

At a second level 420, a sequence may be specified. At this level, a pattern can be given a start position in a line, a start polarity, a length, and a repeat number. A sequence can be outputted on a line in a given image sensor region. In the context of vertical timing outputs for an image sensor, a sequence may be referred to as a V sequence.

At a third level 430, an image sensor may be broken up into distinct regions (or sets of lines in a frame or field). A sequence may be specified for each region via a pointer into a parameter storage unit.

At a fourth level 440 regions may then be chosen to make up a field.

At a fifth level 450, a mode may be specified. A mode may consist of a set of fields that can be outputted. Different fields can be outputted to support any number of specific image sensor operational modes.

FIG. 4b illustrates a method for constructing a waveform using the waveform hierarchy 400 shown in FIG. 4a.

In act 415, a pattern may be generated by creating the appearance of a basic pulse for one or more outputs (e.g., vertical pulse output V1, V2, . . . , Vy for an image sensor). The appearance of the basic pulse may take any desired form, and may comprise any number of desired toggles. In one embodiment, two, three, and/or four toggles may be specified to define one or more basic pulses.

In addition to the number of toggles, the start polarity, and the length between toggles may be specified so as to define the appearance of the basic pulse. FIG. 4c illustrates a pattern 410' comprising a basic pulse with two toggles. It should be appreciated that the pattern 410' is only an example of many possible patterns, and the invention is not limited in this respect.

In act 425, a sequence for one or more outputs (e.g., V1, V2, . . . , Vy) may be generated based on specifications for a start polarity, a pattern length, a start position, and/or a number of repetitions. In some embodiments, a start polarity and/or a pattern length may be specified to define a pattern, and a start position and a number of repetitions may be specified to define a sequence. FIG. 4c illustrates a sequence 420' comprising three repetitions of the pattern 410' with a low start polarity.

In act 435, different regions (within a field or frame) may be assigned sequences defined in act 425. FIG. 4c illustrates regions 430a', 430b', and 430c' each containing a specified sequence.

In act 445, a waveform for a field (comprising one or more regions) may be constructed from waveforms associated with the regions within the field. FIG. 4c illustrates a field 440' comprising three regions 430a', 430b', and 430c'.

In act 455, a waveform associated with a mode may be constructed by stringing together waveforms associated with one or more fields. FIG. 4c illustrates a mode 450' comprising two fields.

Figure 5:
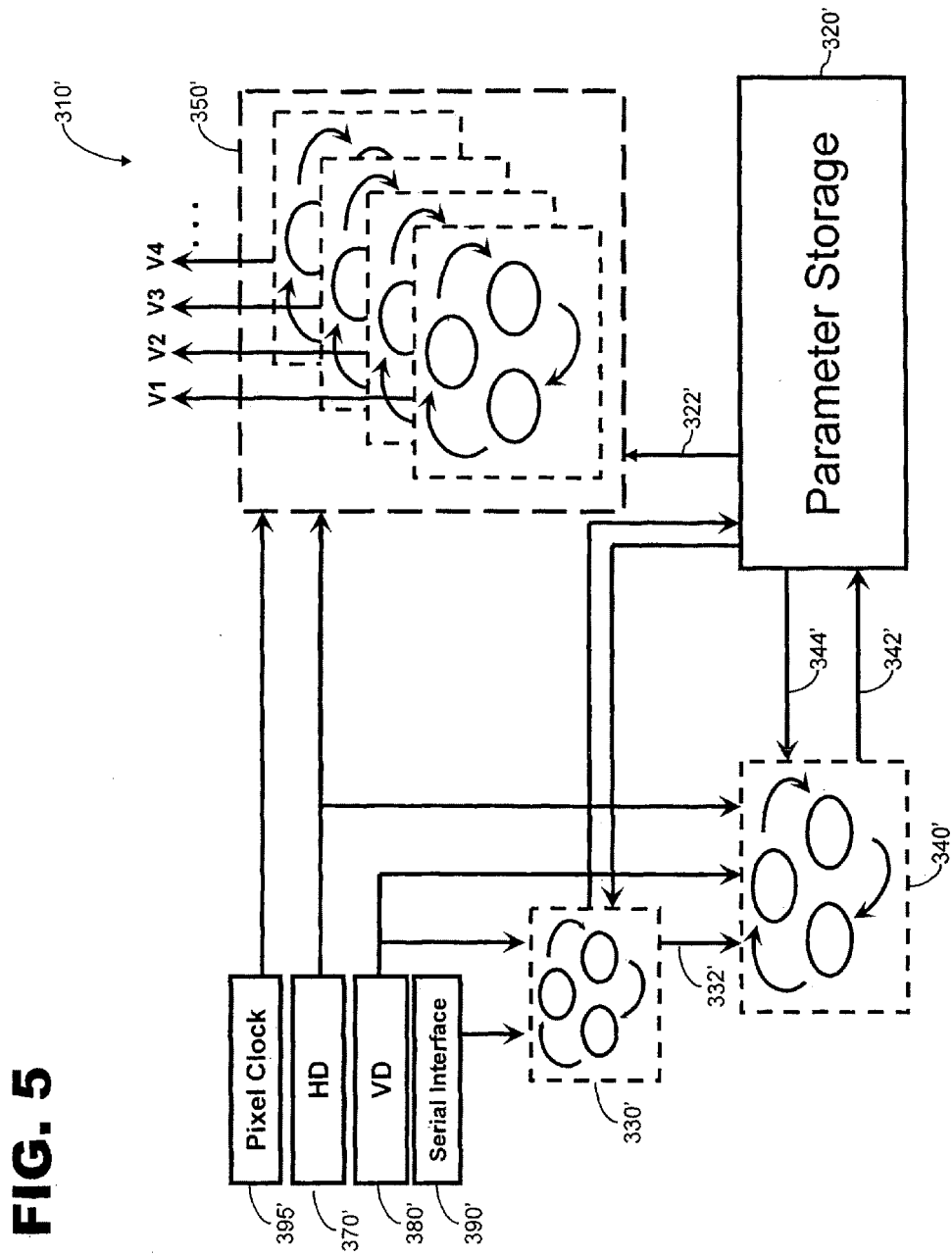
FIG. 5 is a block diagram of a vertical timing generator, in accordance with one embodiment of the invention.

FIG. 5 illustrates one embodiment of a vertical timing generator 310' that may be used in a configurable TG. In one embodiment, the vertical timing generator 310' may be used in the configurable TG 300 illustrated in FIG. 3. The vertical timing generator 310' comprises a mode state machine 330', a line state machine 340', and one or more pixel state machines 350'.

The mode state machine 330' may be configured by system synchronization pulses (e.g., the vertical synchronization pulse 380') and by information sent via a serial interface 390'. The mode state machine 330' may be considered a top-level state machine that controls the operational mode of the TG, and may impart the type and order of fields to be generated by the TG.

The line state machine 340' can interface between the mode state machine 330' and the configurable parameter storage unit 320'. As previously noted, the mode state machine 330' can determine which high-level fields should be outputted in a given mode of operation and may send this information (e.g., in the form of field pointers) 322' to the line state machine 340'. The line state machine 340' can then determine where these fields are stored in memory and can provide an address 342' to the configurable parameter storage unit 320'.

The configurable parameter storage unit 320' can then provide field parameter data 344' to the line state machine 340', describing how a given field is divided (i.e., regions). The line state machine 340' may monitor the current readout line of the image sensor (based on HD 370' and VD 380' signals) and control the download of data from the configurable parameter storage unit 320'.

The configurable parameter storage unit 320' can also provide vertical pulse parameter data 322', including specific pattern and sequence parameters (e.g., toggles, polarity, lengths, repeats), to the pixel state machines 350'. The pixel state machines 350' can then generate vertical timing pulses (e.g., V1, V2, ..., Vy) using the HD 370' and pixel clock 395' inputs. In some embodiments, the vertical timing pulses (e.g., V1, V2, ..., Vy) may be outputted to clock an image sensor (e.g., CCD or CMOS sensor).

Figure 6A:
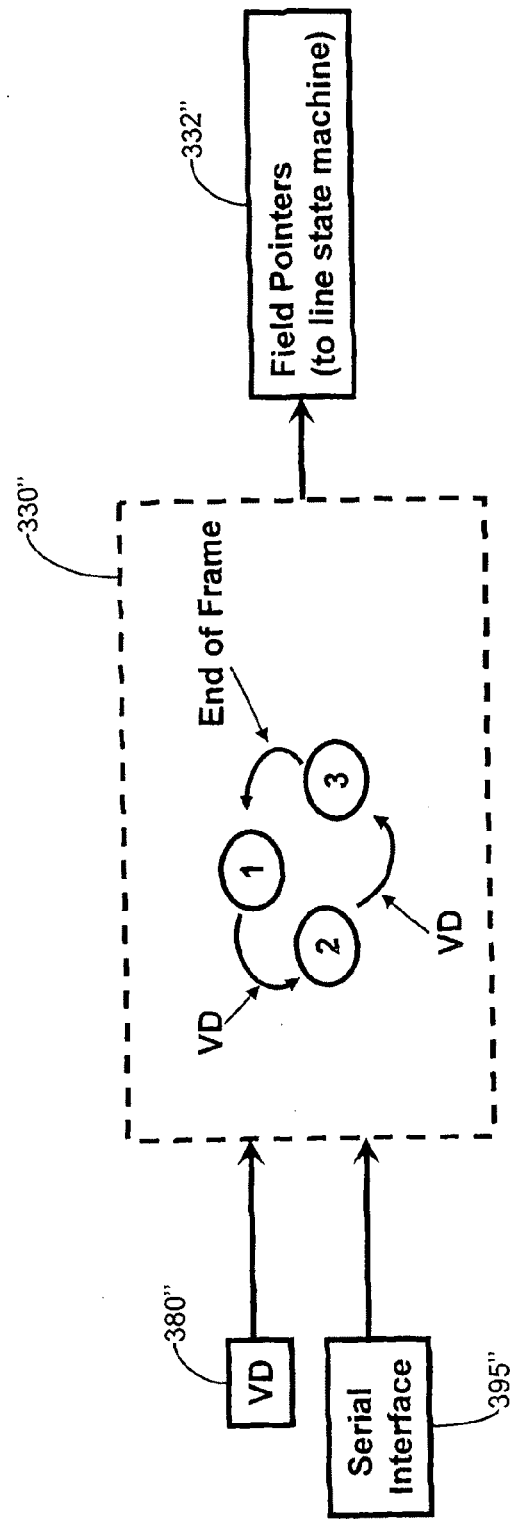
FIG. 6a is a state machine diagram of a mode state machine, in accordance with one embodiment of the invention.

FIG. 6a illustrates one embodiment of a mode state machine 330" that may be used in a vertical timing generator. In one embodiment, the mode state machine 330" may be used in the vertical timing generator 310' of FIG. 5. It should be appreciated that the mode state machine 330" shows three states, but this is only an example, and any number of states are possible, as the invention is not limited in this respect.

The highest level of abstraction for a timing generator is a mode. A mode comprises fields to be outputted in a given operational mode, as well as the specific fields and the order of output of those fields.

A serial interface 395" can be used to program a mode register of the mode state machine 330" to contain the number of fields to output and field pointers of the fields to be outputted. Field pointer information 332" can be provided to a line state machine which translates the field pointer information 332" into a specific memory address.

The mode state machine 330" can increment to a next state whenever an vertical synchronization pulse (VD) 380" is received, and output the field pointer of the current state. Upon reaching the end of the frame, the mode state machine 330" can reset to a first state (1). The fields outputted during a cycle of the mode state machine 330" constitute a frame.

An example of field pointers 601, 602, and 603 pointing to three different fields 604, 605, and 606 in memory is shown in FIG. 6b, and correspond to the three field pointers outputted by the mode state machine 330" in the example of FIG. 6a. Field pointer 601 corresponds to the field pointer output 332" that the mode state machine 330" outputs when in the first state (1), where field pointer 601 points to a field 604 comprising three regions. Upon receiving a vertical synchronization pulse (VD) 380", the mode state machine 330" increments to a second state (2), and outputs a field pointer 602 pointing to a second field 605. Then, upon receiving a next vertical synchronization pulse (VD) 380", the mode state machine 330" increments to a third state (3), and outputs a field pointer 603 pointing to a third field 606. In this example, the third state (3) is the final state for the mode state machine 330", as defined by the number of fields inputted via the serial interface 395". Therefore, upon receiving the next vertical synchronization pulse (VD) 380", the mode state machine 330" increments to the first state (1) and the process can commence once more.

In the example illustrated in FIG. 6b, the frame 610 comprises three fields 604, 605, and 606 pointed to by the field pointers 601, 602 and 603, but it should be appreciated that a frame may comprise any number of frames, as the invention is not limited in this respect.

Figure 7A:
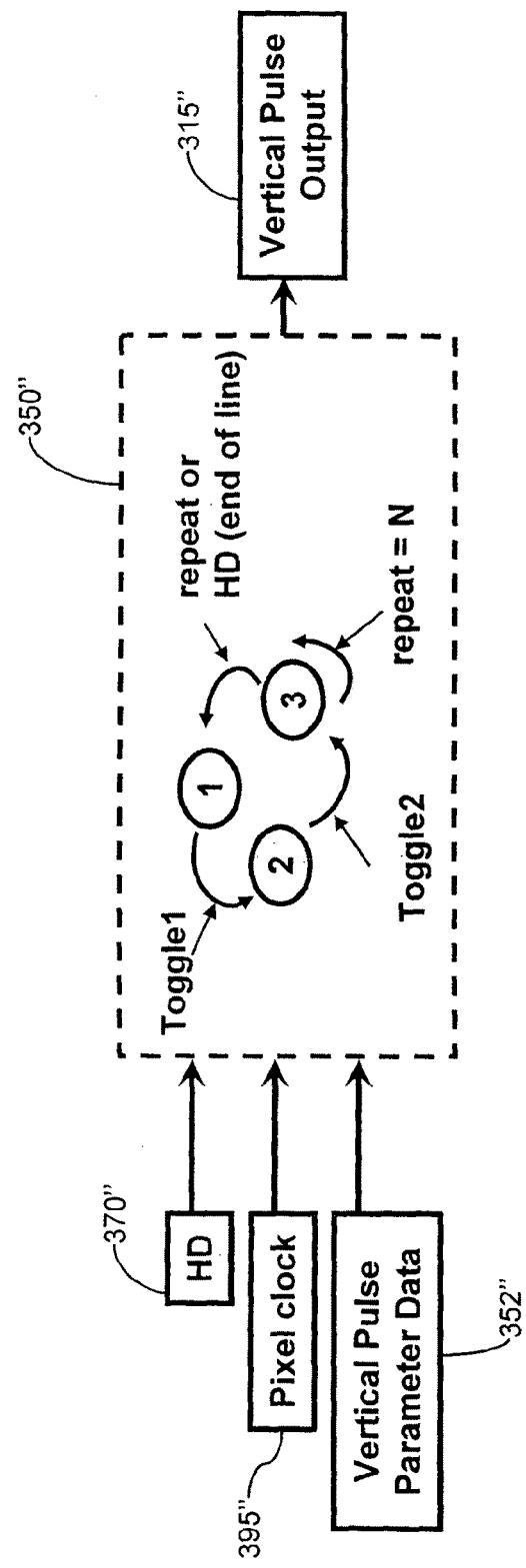
FIG. 7a is a state machine diagram of a pixel state machine, in accordance with one embodiment of the invention.

FIG. 7a illustrates one embodiment of a pixel state machine 350". In one embodiment, the pixel state machine 350" may be used as one of the pixel state machines 350' in the vertical timing generator 310' of FIG. 5. It should be appreciated that the pixel state machine 350" shows three states, but this is only an example, and any number of states is possible, as the invention is not limited in this respect.

The pixel state machine 350" can accept data from a parameter storage unit, where the data can include vertical pulse parameter data 352". The vertical pulse parameter data 352" may define a V pattern and a V sequence. In one embodiment, the vertical pulse parameter data 352" can include information related to toggles, polarity, length, and repeats that define a V pattern and a V sequence that repeats the V pattern.

In addition to a pixel clock 395", the pixel state machine 350" can also accept an horizontal synchronization pulse (HD) 370" as input. The pixel state machine 350" can keep track of the specific pixel on which the TG is operating in a given line.

The pixel state machine 350" can also generate and output vertical timing pulses 315" which can be used for image sensor readout. Vertical pulse parameter data 352" may comprise toggle, polarity, length, and repeat information and may be provided from the parameter storage unit, and this information, coupled with the pixel number in a line, can be used by the pixel state machine 350" to construct the output waveform.

The pixel state machine 350" can evaluate its state on every pixel clock edge and can reset when an HD 370" synchronization pulse is received or when the previous pulse output is complete. The pixel state machine 350" can advance state when a polarity change or toggle is desired, as defined by the vertical pulse parameter data 352". The pixel state machine 350" can cycle until the desired number of V pattern repeats (forming the V sequence) have been generated.

An example of a V sequence waveform 700 outputted by the pixel state machine 350" (in the example of FIG. 7a) is shown in FIG. 7b. The V sequence waveform 700 comprises N repeats 702 of a V pattern waveform 710. In this example, the V pattern waveform 710 can be defined by a start polarity 704, a first toggle (toggle 1) 706, a second toggle (toggle 2) 708, and a pattern length 712. Each constant polarity segment of the V pattern waveform 710 corresponds to a given state of the pixel state machine 350" in the example of FIG. 6*a*. Additionally, the N repeats 702 of the V pattern 710 that constitute the V sequence waveform 700 correspond to the N cycles of the pixel state machine 350".

In the example shown in FIG. 7*b*, three constant polarity segments of the V pattern 710 are shown, but this is only an example, and any number of polarity segments are possible, as the invention is not limited in this respect.

Figure 8A:
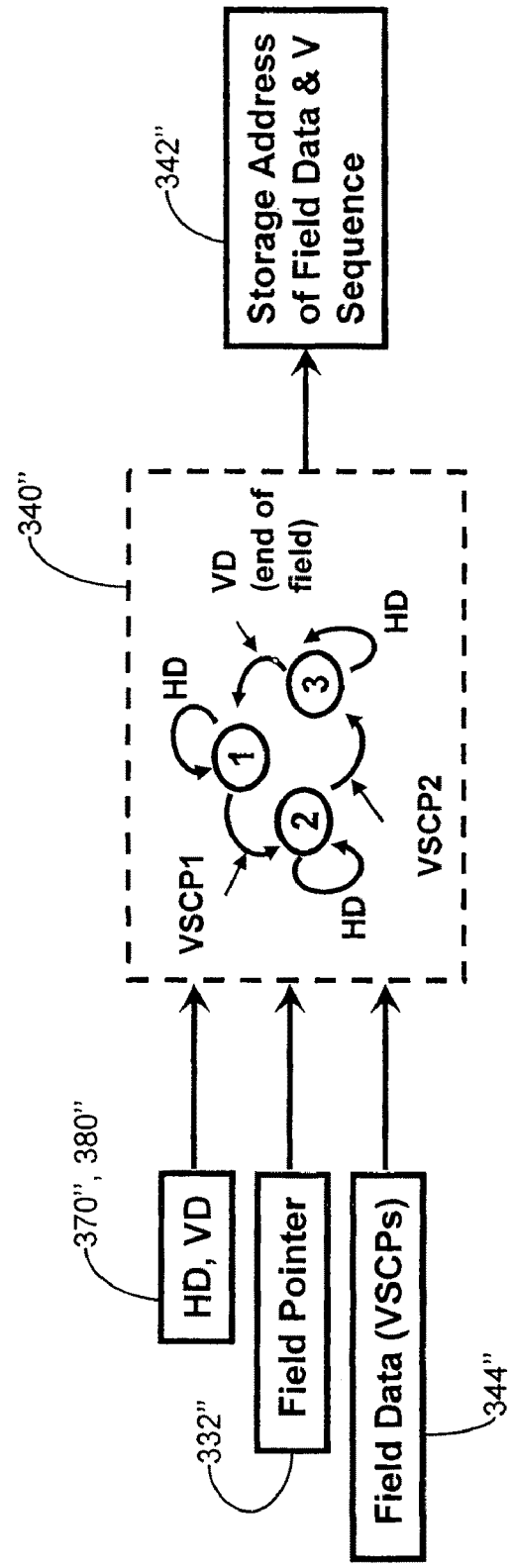
FIG. 8a is a state machine diagram of a line state machine, in accordance with one embodiment of the invention.

FIG. 8*a* illustrates one embodiment of a line state machine 340". In one embodiment, the line state machine 340" may be used in the vertical timing generator 310' of FIG. 5. It should be appreciated that the line state machine 340" shows three states, but this is only an example, and any number of states is possible, as the invention is not limited in this respect.

The line state machine 340" can serve as an interface between a mode state machine and a parameter storage unit. The mode state machine may control the top-level operational mode of the TG (by indicating which fields should be output and in which order), and the line state machine 340" can control the appearance of a given field.

Field pointer information 332" may be provided to the line state machine 340" by the mode state machine. The field pointer information 332" can be translated into a particular memory address to access the parameter storage unit. The parameter storage unit can then provide information defining the specific region make-up of a field. Each region can have associated pointer information that points into a V sequence pool, which in turn contains toggle, polarity, length, and repeat information that may be provided to the pixel state machine by the parameter storage unit.

The line state machine 340" can accept line and field synchronization pulses (i.e., HD 370" and VD 380") as inputs, as well as field pointers 332" and field parameter date 344". The field parameter data 344" can include field data that defines the region make-up of a field. For example, the field data may include one or more V sequence change positions (VSCP1, VSCP2, . . . ) that define the position along the field waveform at which point a transition to the next region (and an associated V sequence) should occur.

The line state machine 340" can examine its state when it receives an HD pulse 370", and therefore the line state machine 340" can keep track of the specific line on which the TG is operating in a given field. The line state machine 340" can increment state when a specified number of HD pulses have been received (i.e., the number of HDs equal to the current VSCPx parameter).

When a new line state is entered, address information 342" can be provided to the parameter storage unit, and the parameter storage unit can then provide new vertical pulse parameter data to the pixel state machines which control the output of the vertical timing pulses. Upon receiving a VD pulse 380", the line state machine 340" may return to a first state, having completed the generation and output for a complete field.

Figure 8B:
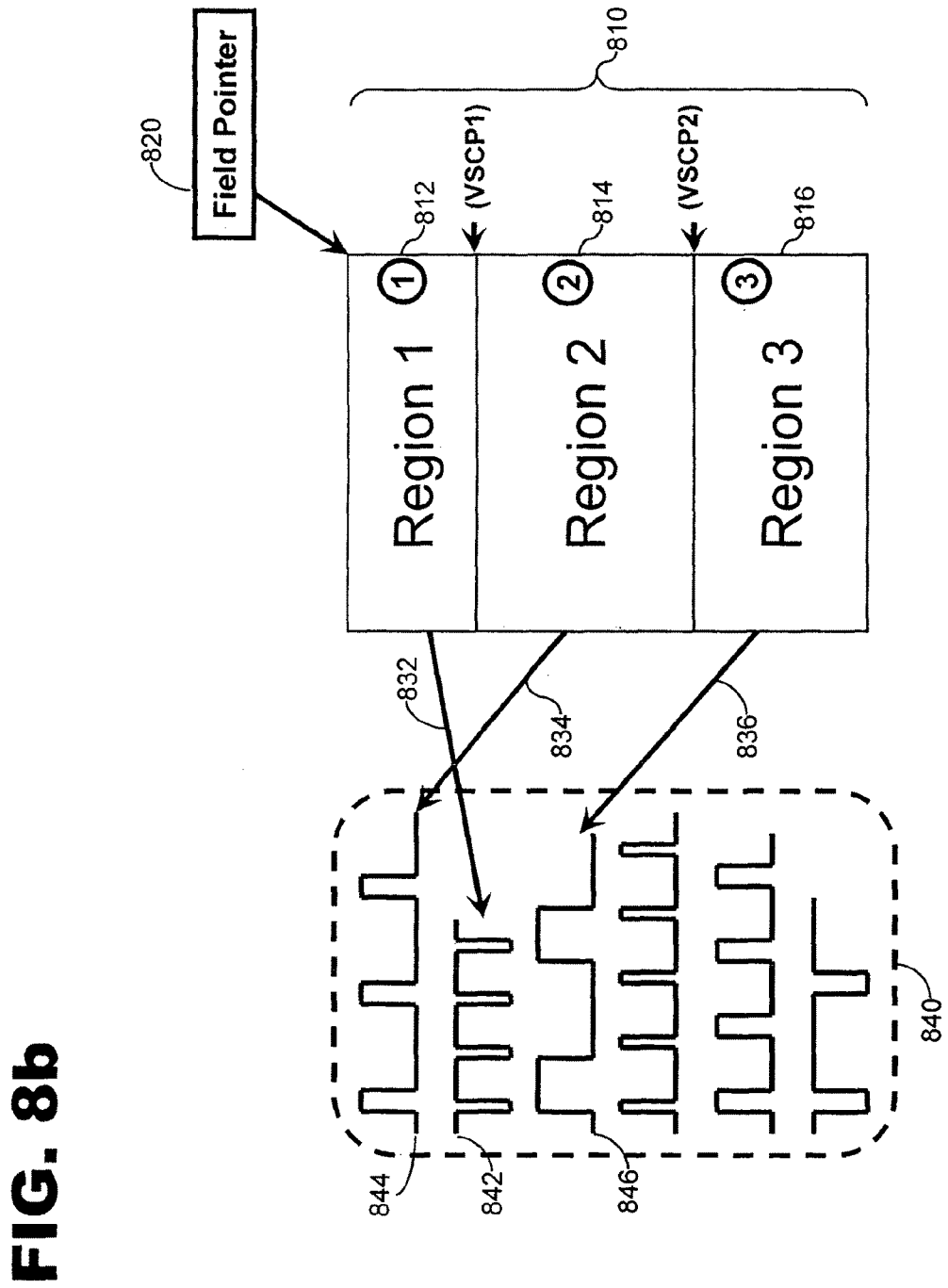
FIG. 8b is an illustration of a region make-up of a field generated by the line state machine of FIG. 8a, in accordance with one embodiment of the invention.

An example of a field 810 (pointed to by the field pointer 820) associated with the output of the line state machine 340" (in the example of FIG. 8*a*) is shown in FIG. 8*b*. In this example, the field 810 comprises three regions 812, 814, and 816, defined by two V sequence change position parameters (VSCP1 and VSCP2). Each region has an associated V sequence pointer (832, 834, and 836) pointing to a given V sequence (842, 844, and 846, respectively) in a V sequence pool 840.

In the example illustrated in FIG. 8*b*, the field 810 comprises three regions corresponding to three states of the line state machine 340" (indicated by numerals 1, 2, and 3), but it should be appreciated that a field and an associated line state machine may comprise any number of regions, as the invention is not limited in this respect.

Figure 9:
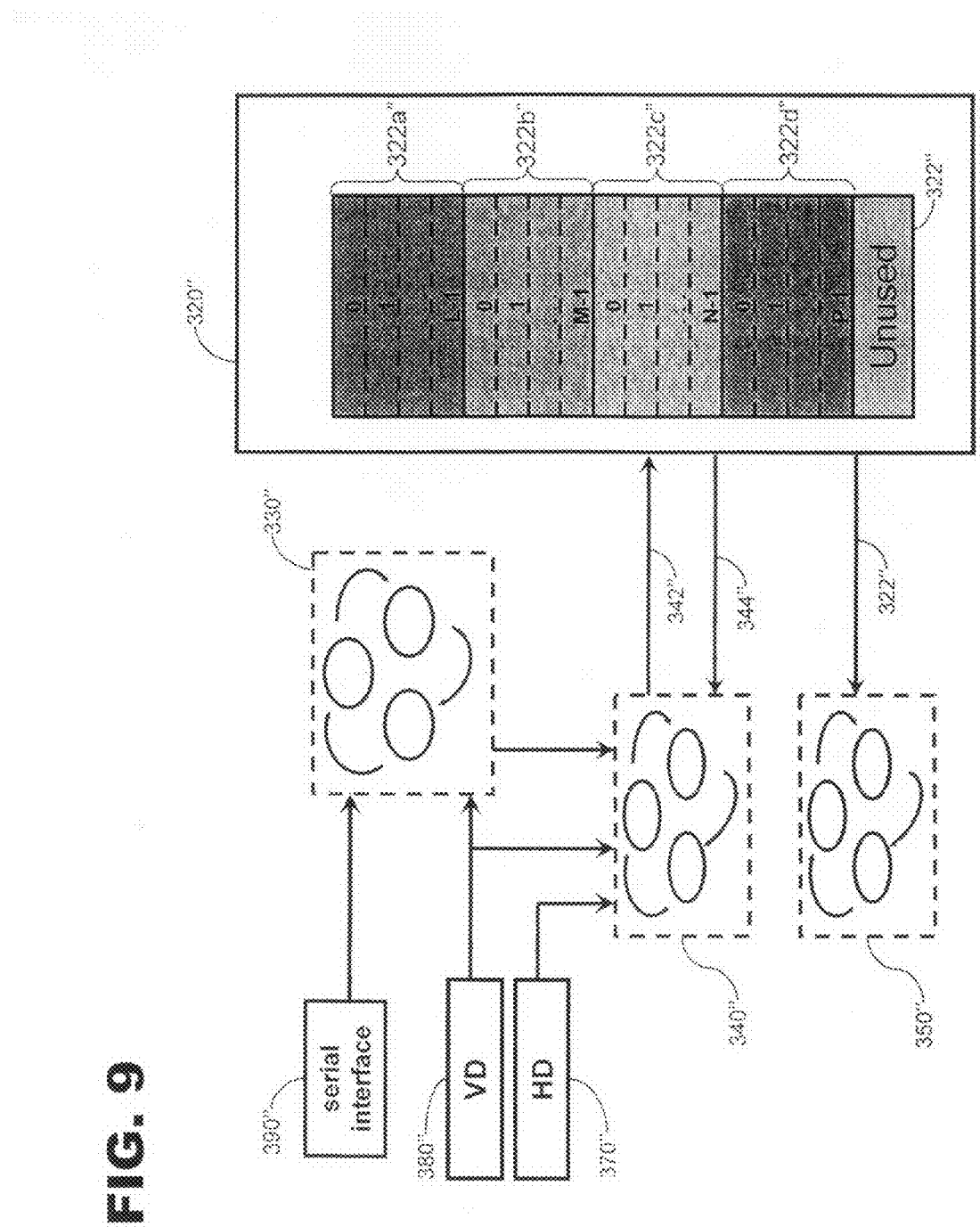
FIG. 9 is a block diagram of a configurable parameter storage unit and state machines that may interface with the configurable parameter storage unit, in accordance with one embodiment of the invention.

FIG. 9 illustrates one embodiment of a configurable parameter storage unit 320". The configurable parameter storage unit 320" comprises a parameter storage area 322" that can be configured so as to store parameters associated with any number of waveform hierarchy elements (e.g., patterns, sequences, regions, and/or fields). In the embodiment of FIG. 9, the parameter storage area 322" is configured so as to be able to store parameters associated with L patterns 322*a*", M sequences 322*b*", N regions 322*c*", and P fields 322*d*", but this is just one example of a configuration for a configurable parameter storage area, and the parameter storage area 322" may be configured to store parameters associated with any other number and/or type of waveform hierarchy elements.

To address the multitude of possible image sensor arrays with differing architectures, pixel number, and/or timing considerations, a configurable parameter storage unit 320" can allow a user of the TG to configure the parameter storage unit 320" so as to specify any number of V patterns, V sequences, regions, and fields desired for a particular application (e.g., a particular image sensor array with a specific architecture, pixel number, and/or timing considerations).

The configurable parameter storage unit 320" can allow the user to tailor the TG to a particular application, for example a particular image sensor array. The user can program a mode state machine 330" with the L, M, N, and P parameters specified via a serial interface 390". The mode state machine 330" can then interact with line and pixel state machines, 340" and 350", to control access to the configurable parameter storage unit 320", as described above in relation to FIG. 3-8.

Figure 10A:
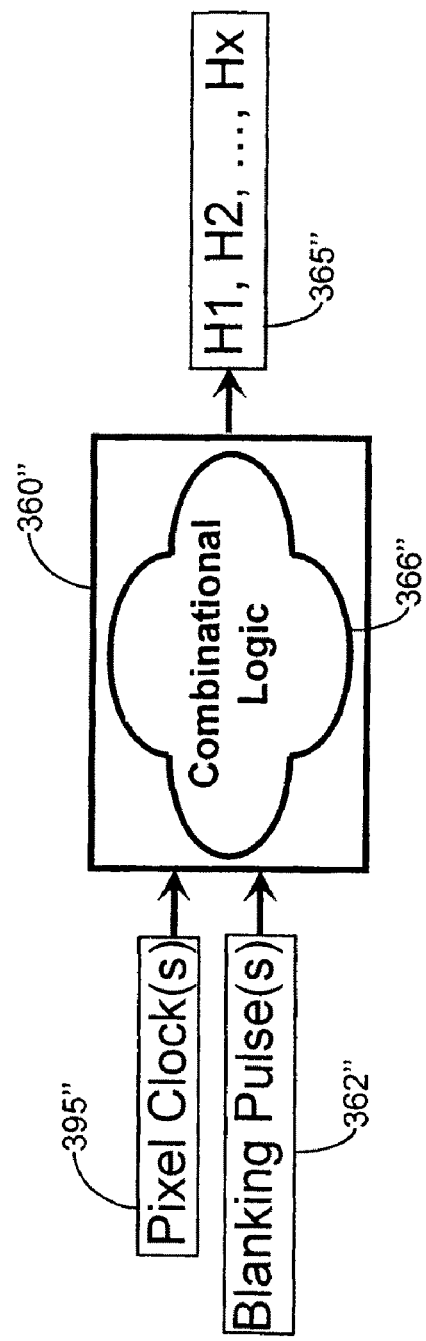
FIG. 10a is a block diagram of an horizontal timing generator, in accordance with one embodiment of the invention.

FIG. 10*a* illustrates one embodiment of an horizontal timing generator 360". The horizontal timing generator may comprise combinatorial logic 366" and may create clocking and control pulses that can enable the read out of an horizontal shift register on an image sensor, as illustrated by the output of one or more horizontal timing pulses (H1, H2, . . . Hx) 365" in FIG. 10*a*.

The horizontal timing generator 360" accepts one or more pixel clocks 395" as input and can interface with a pixel state machine of a vertical timing generator. The interface with the vertical timing generator can enable the generation of complex timing signals that may be desired for certain image sensor (e.g., CCDs having horizontal/vertical pixel mixing).

Figure 10B:
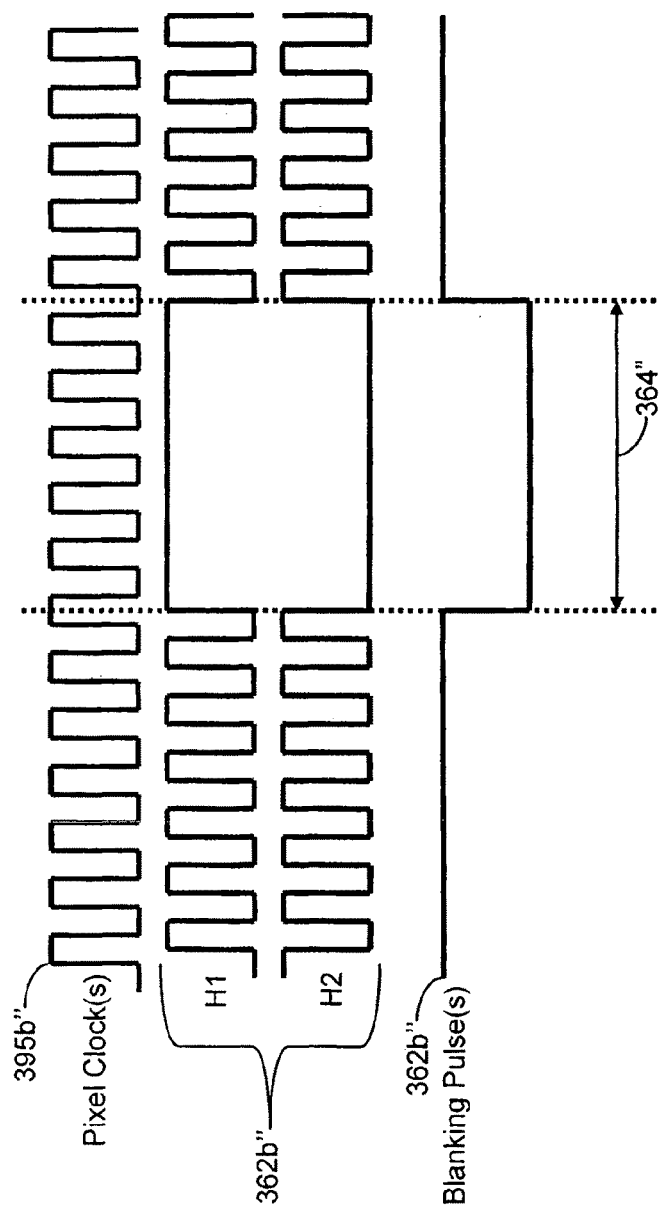
FIG. 10b is a timing diagram for blanking and horizontal timing pulses generated by the horizontal timing generator shown in FIG. 10a, in accordance with one embodiment of the invention.

In one embodiment, the interface with the vertical timing generator provides one or more blanking pulse(s) 362" to the horizontal timing generator 360". Horizontal timing pulse signals (H1, H2, . . . Hx) 365*b*" can be set to constant polarities when the blanking pulse attains a specific polarity. In the timing diagram example of FIG. 10*b*, a blanking pulse 362*b*" exhibits a low polarity for a finite blanking period 364", during which time the horizontal timing pulse signals H1 and H2 365*b*" are keep constant. Upon the termination of the finite blanking period 364", the horizontal timing pulse signals H1 and H2 365*b*" once again exhibit a timing pulse waveform.

Using this horizontal timing generation technique, a blanking pulse may be sent from the vertical timing generation to the horizontal timing generator when a vertical shift of pixel content information (e.g., in an image sensor shift register) is being performed, ensuring that horizontal shifts are not performed during the vertical shift. Upon completion of the vertical shift of the pixel content information, the blanking period 364" can terminate, and horizontal timing pulses can be resumed, thereby shifting the pixel content information horizontally so as to allow read-out of the pixel content information on the pixel row being shifted.

It should be appreciated that embodiments of the invention are not limited to generating timing for an image sensor, and may be used in any application where the generation of a timing waveform is desired. It should also be appreciated that embodiments of the configurable TG may be used to generate timing signals for a plurality of blocks in an image sensor signal processing channel, as shown in the example of FIG. 1.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
    one or more state machines of a timing generator, the one or more state machines being configured to output at least one timing signal; and
    a configurable parameter storage unit interfacing with the one or more state machines, the parameter storage unit including a parameter storage area configurable so as to store a plurality of parameters at least partially defining a desired plurality of waveform hierarchy elements for the at least one timing signal, the desired plurality of waveform hierarchy elements enabling the definition of a waveform,
    wherein the configurable parameter storage unit is configured to receive one or more memory addresses from a first state machine in the timing generator, and to provide the first state machine with information associated with regions of one or more fields to be outputted in a given mode of operation, and
    wherein the configurable parameter storage unit is configured to provide vertical pulse parameter data to a second state machine in the timing generator.

2. The apparatus of claim 1, wherein the desired plurality of waveform hierarchy elements comprise at least one pattern, and the at least one pattern comprising a basic pulse.

3. The apparatus of claim 1, wherein the desired plurality of waveform hierarchy elements comprise at least one sequence, the at least one sequence comprising a plurality of repetitions of a pattern, and the pattern comprising a basic pulse.

4. The apparatus of claim 1, wherein the desired plurality of waveform hierarchy elements comprise at least one region, the at least one region comprising a plurality of repetitions of a sequence, the sequence comprising a plurality of repetitions of a pattern, and the pattern comprising a basic pulse.

5. The apparatus of claim 1, wherein the desired plurality of waveform hierarchy elements comprise at least one field, the at least one field comprising at least one region, the region comprising a plurality of repetitions of a sequence, the sequence comprising a plurality of repetitions of a pattern, and the pattern comprising a basic pulse.

6. The apparatus of claim 1, wherein the vertical pulse parameter data comprises toggles, polarity, lengths, and repeats.

7. The apparatus of claim 1, wherein the first state machine is a line state machine, and wherein the second state machine is a pixel state machine.

* * * * *